United States Patent
Adkisson et al.

(10) Patent No.: US 7,774,562 B2
(45) Date of Patent: Aug. 10, 2010

(54) TIMEOUT ACCELERATION FOR GLOBALLY SHARED MEMORY TRANSACTION TRACKING TABLE

(75) Inventors: Richard W. Adkisson, Dallas, TX (US); Christopher Greer, Allen, TX (US); Huai-ter Victor Chong, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1727 days.

(21) Appl. No.: 10/944,524

(22) Filed: Sep. 17, 2004

(65) Prior Publication Data

US 2006/0063501 A1    Mar. 23, 2006

(51) Int. Cl.
*G06F 13/36* (2006.01)

(52) U.S. Cl. .................. 711/156; 711/144; 711/148; 711/153

(58) Field of Classification Search .................. 711/144
See application file for complete search history.

(56) References Cited

U.S. PATENT DOCUMENTS

| | | | |
|---|---|---|---|
| 5,485,409 A * | 1/1996 | Gupta et al. ............... 726/25 |
| 5,845,071 A | 12/1998 | Patrick et al. | |
| 5,930,822 A | 7/1999 | Chaney et al. | |
| 5,991,893 A | 11/1999 | Snider | |
| 6,081,876 A | 6/2000 | Brewer et al. | |
| 6,154,765 A | 11/2000 | Hart | |
| 6,389,451 B1 | 5/2002 | Hart | |
| 6,401,174 B1 | 6/2002 | Hagersten et al. | |
| 6,449,699 B2 | 9/2002 | Franke et al. | |
| 6,473,826 B1 * | 10/2002 | Allingham ............... 710/310 |
| 7,219,268 B2 * | 5/2007 | Adkisson et al. ............ 714/55 |

* cited by examiner

Primary Examiner—Hetul Patel

(57) ABSTRACT

A method of operating a central cache controller ("CCC") in a first cell of a multiprocessor system comprising multiple cells each including globally shared memory ("GSM"), wherein the first cell is disposed in a first partition and the CCC is connected to a plurality of CPUs of the first cell. In one embodiment, the method comprises, responsive to a new transaction request from one of the CPUs, logging the transaction in a transaction table; determining whether an identity marker in a timeout map corresponding to a cell to which the transaction was issued is set; and, responsive to the corresponding identity marker in the timeout map being set, immediately returning a special error to the one of the CPUs that requested the transaction.

25 Claims, 4 Drawing Sheets

TIMEOUT ACCELERATION FOR GLOBALLY SHARED MEMORY TRANSACTION TRACKING TABLE

BACKGROUND

There exists an ever-increasing need for more powerful computing platforms, e.g., servers, to meet the demands of modern transaction processing systems and Internet data providers. A variety of architectural technologies exist to meet such demands. Among these technologies are clustering and multiprocessing (e.g., symmetric multiprocessor ("SMP") systems). Clusters are popular due to their low cost, reliability, and scalability; however, they are also associated with substantial overhead in system management and maintenance. SMP systems provide better performance and simplify system management and maintenance issues; however, due to technology limitations, SMP systems cannot scale beyond a limited number of processors. Both types of technologies are a part of mainstream computing technology. More recently, a third technology, referred to as cache-coherent nonuniform memory access (ccNUMA) architecture, has provided another approach to the problem of meeting increased processing demands. In particular, ccNUMA obviates the scalability limits of SMP systems while continuing to provide a single-system image that simplifies management and maintenance. A typical ccNUMA system design is implemented using several SMP "cells" that are connected via a cache-coherent switch, or "cross-bar". The crossbar supports access to globally shared memory ("GSM") across all processors in the system.

There are many advantages to ccNUMA systems, including scalability, ease of management, and reduced maintenance costs. Another advantage of ccNUMA systems is that they support partitioning of the system for purposes of containing failures, facilitating management, and isolating workload. Each such partition includes one or more cells and has a hardware "firewall" around it that prevents external agents from crashing the partition.

When the system architecture of a ccNUMA system is fixed, individual processors within cells can be made aware of other elements in the system through an available hardware architecture map. This hardware architecture map can be provided to the processor by inclusion in the read-only memory (ROM) of the processor. In this configuration, a processor accesses the hardware architecture map stored in ROM to determine which other system components are available and communicates accordingly. Additionally, each processor within a cell maintains a protection domain set ("PDS"), which identifies other cells within the same partition as the cell, and a coherency set ("CS"), which identifies other cells from which the processors within the cell can read. In general, a cell is operable to read from cells outside the PDS but inside the CS of the cell via GSM.

In multi-partition systems that include GSM, the crashing of one partition will typically slow down all accesses to that partition by another partition. If these delays are excessive, they may cause the accessing partition to crash. Clearly, this is an undesirable result.

SUMMARY

In one embodiment, a method is provided for operating a central cache controller ("CCC") in a first cell of a multiprocessor system comprising multiple cells each including globally shared memory ("GSM"), wherein the first cell is disposed in a first partition and the CCC is connected to a plurality of CPUs of the first cell. The method comprises, responsive to a new transaction request from one of the CPUs, logging the transaction in a transaction table; determining whether an identity marker in a timeout map corresponding to a cell to which the transaction was issued is set; and, responsive to the corresponding identity marker in the timeout map being set, returning a special error to the one of the CPUs that requested the transaction.

DETAILED DESCRIPTION OF THE DRAWINGS

Figure 1:
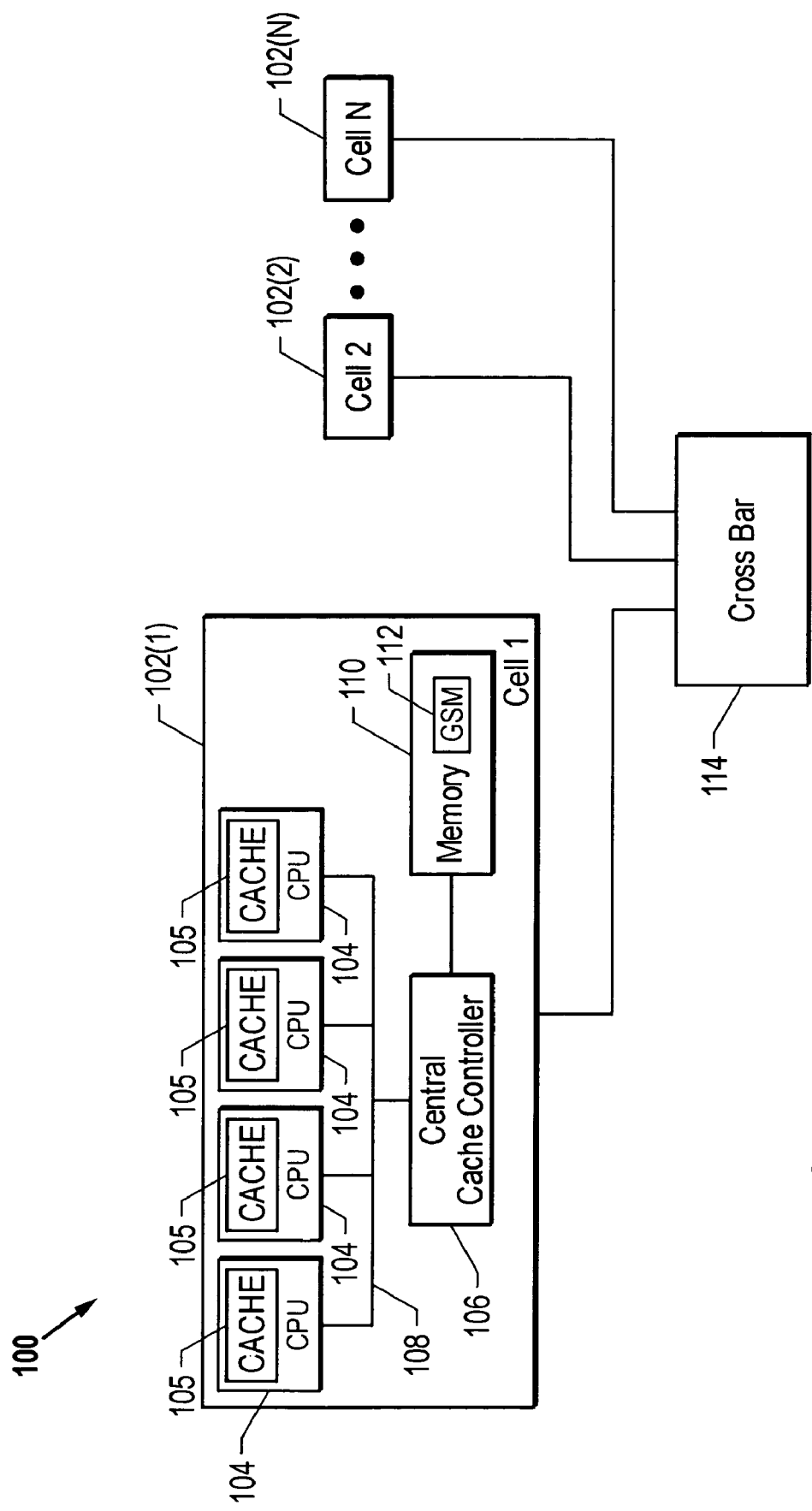
FIG. 1 is a block diagram illustrating a GSM multiprocessor computer system comprising a plurality of cells.

In the drawings, like or similar elements are designated with identical reference numerals throughout the several views thereof, and the various elements depicted are not necessarily drawn to scale.

FIG. 1 is a block diagram illustrating a cache-coherent non-uniform memory access ("ccNUMA") multiprocessor computer system 100 comprising a plurality of cells 102(1)-102(N). In one embodiment, the value of N is 16; however, it will be recognized that other numbers of cells may be implemented. Configuration of the cells 102(1)-102(N) will be described with reference to cell 102(1), it being understood that the configuration of the remaining cells 102(2)-102(N) is identical in all relevant respects to that of the cell 102(1). The cell 102(1) includes a number of CPUs 104 each having an internal cache 105 and connected to a central cache controller 106 via one or more CPU buses, represented in FIG. 1 by a CPU bus 108. The central cache controller 106 implements directory-based cache coherency to ensure that all of the CPUs 104 have a consistent view of the memory 110. A portion of the memory 110 is designated as globally shared memory ("GSM") 112. The cells 102(1)-102(N) are interconnected via a crossbar 114. As previously indicated, the system 100 is a ccNUMA system, such that each cell can access GSM of another cell via the crossbar 114.

As previously described, a principal advantage of a ccNUMA machine is that it offers a single system image across a large number of processors. It is often desirable, however, to partition a large ccNUMA machine into smaller, isolated configurations. Such partitioning is useful for isolating workloads, containing faults, providing high availability, and supporting different operating systems on a single machine. Partitioning thus adds a high degree of flexibility. For example, a banking system may designate a portion of the resources in a ccNUMA machine to serve requests incoming via the Web, while the rest of the machine runs the bank's database. By strictly isolating these two workloads, the configuration eliminates interference in performance between the two applications, and enables them to use two different operating systems if required. It will be recognized that each partition will include one or more of the cells 102(1)-102(N).

Further, as set forth above, all of the cells 102(1)-102(4) are interconnected by the crossbar 114, which is a cache coherent switch that facilitates access by the processors of one cell to the GSM of another cell. In particular, the crossbar 114 enables the processors of one cell, such as the cell 102(2), to read from the GSM 112 of another cell, such as the cell 102(1).

Figure 2:
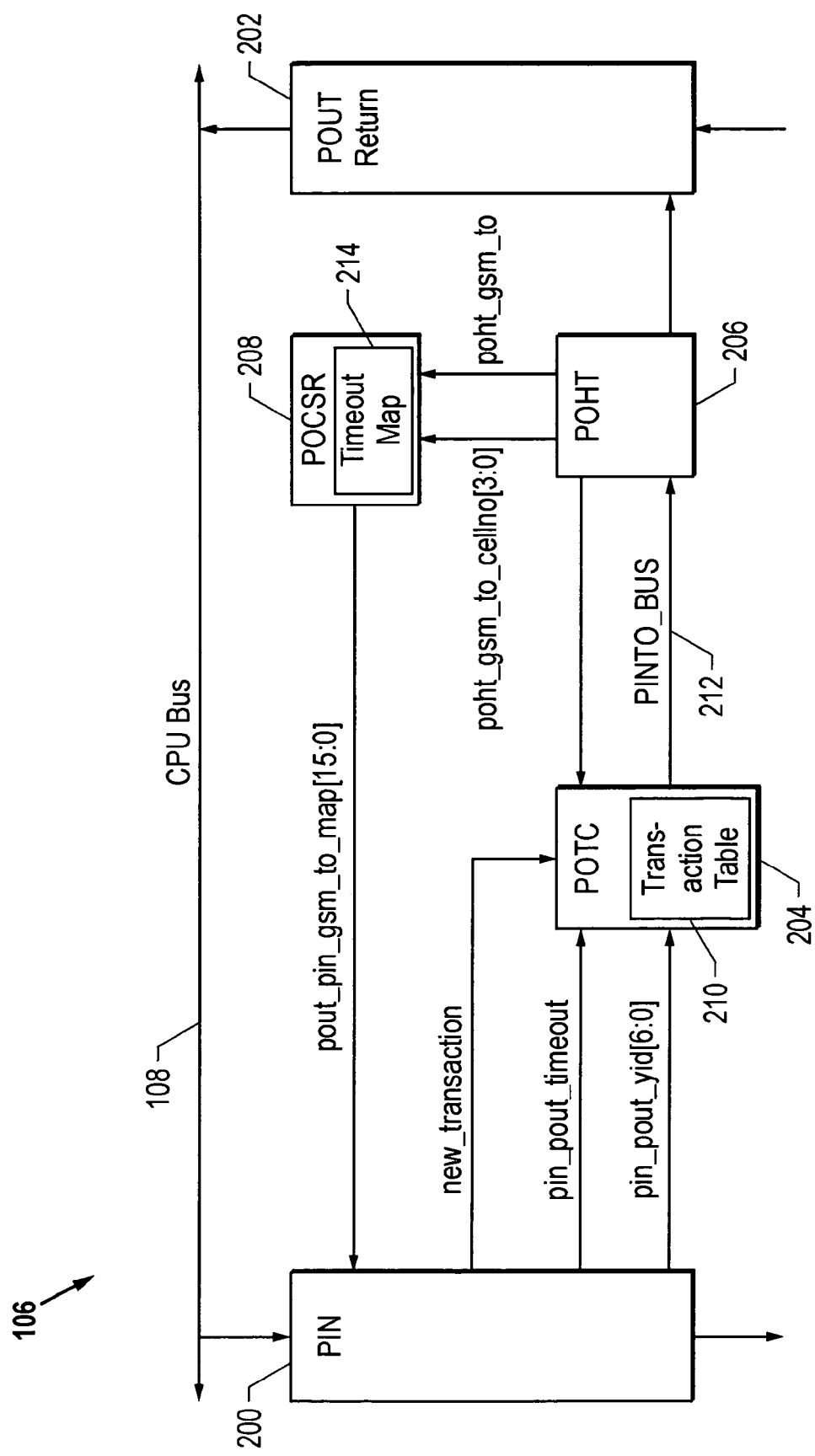
FIG. 2 is a block diagram of a cache controller portion of the computer system of FIG. 1 according to one embodiment.

FIG. 2 is a block diagram of a portion of a central cache controller, such as the central cache controller 106, of the computer system of FIG. 1 according to one embodiment. As illustrated in FIG. 2, the central cache controller 106 includes a plurality of logic blocks, including a processor in ("PIN") block 200, a processor out return ("POUT Return") block 202, a processor out transaction control ("POTC") block 204, a processor out header translate ("POHT") block 206, and a processor out control status register ("POCSR") block 208.

The PIN block 200 receives transactions initiated by the CPUs 104 (FIG. 1) via the CPU bus 108 and enters the transactions in a transaction table 210 within the POTC block 204. This is accomplished using a "new_transaction" signal from PIN 200 to POTC 204. If a transaction times out before it is returned, the POTC block 204 informs the POHT block 206 via a processor in timeout bus ("PINTO_BUS") 212 and the POHT block 206 completes the transaction by returning an error via the POUT Return block 202 and clearing the entry in the transaction table 210. If the transaction is a read from a cell outside the partition in which the cell 102(1) is located, then the timeout is a GSM timeout. In this case, the POHT block 206 asserts a GSM timeout error by asserting a poht_gsm_to signal and then sets a poht_gsm_to_cellno[3:0] signal to identify the cell from which the processor was attempting a read. For example, if the cell from which the processor was attempting a read is identified in the system 100 as cell number 5, then the poht_gsm_to_cellno[3:0] signal will be [0101].

The POCSR block 208, which maintains a timeout map 214, sets appropriate identity marker logic therein, e.g., one or more bits identifying a particular target cell, that corresponds to the cell identified by the poht_gsm_to_cellno[3:0] signal and then sends the map to the PIN 200 via a pout_pin_gsm_to_map[15:0]. Continuing with the previous example, bit position 5 of the timeout map 214 would be set, such that the value of the pout_pin_gsm_to_map[15:0] signal would be [xxxxxxxxx1xxxxx].

As previously indicated, when the PIN 200 first receives a transaction, it adds it to the transaction table 210 via the new_transaction signal. If the transaction is to a cell the corresponding bit of which is set in the timeout map 214, timeout of the transaction will be accelerated as follows. First, the PIN block 200 asserts a pin_pout_timeout signal and sets a value of a pin_pout_yid[6:0] signal equal to the ID of the transaction. The POTC 204 block then marks the transaction in the transaction table 210 as timed out and sends it to the POHT block 206 via the PINTO_BUS 212. In the POHT block 206, operation proceeds as described above.

Without acceleration of GSM timeouts as described herein, a CPU, such as the CPU 104, could execute code in which it sends out one transaction and awaits a response in connection with the transaction before initiating another transaction. If the first transaction is directed to a cell that has crashed and the transaction times out, the CPU could at best wait for a large number of timeout periods before proceeding and at worst end up crashing itself. The GSM timeout acceleration embodiment illustrated in and described with respect to FIG. 2 enables subsequent transactions to a cell that has crashed to timeout immediately, thus enabling the CPU to proceed without delay.

Figure 3:
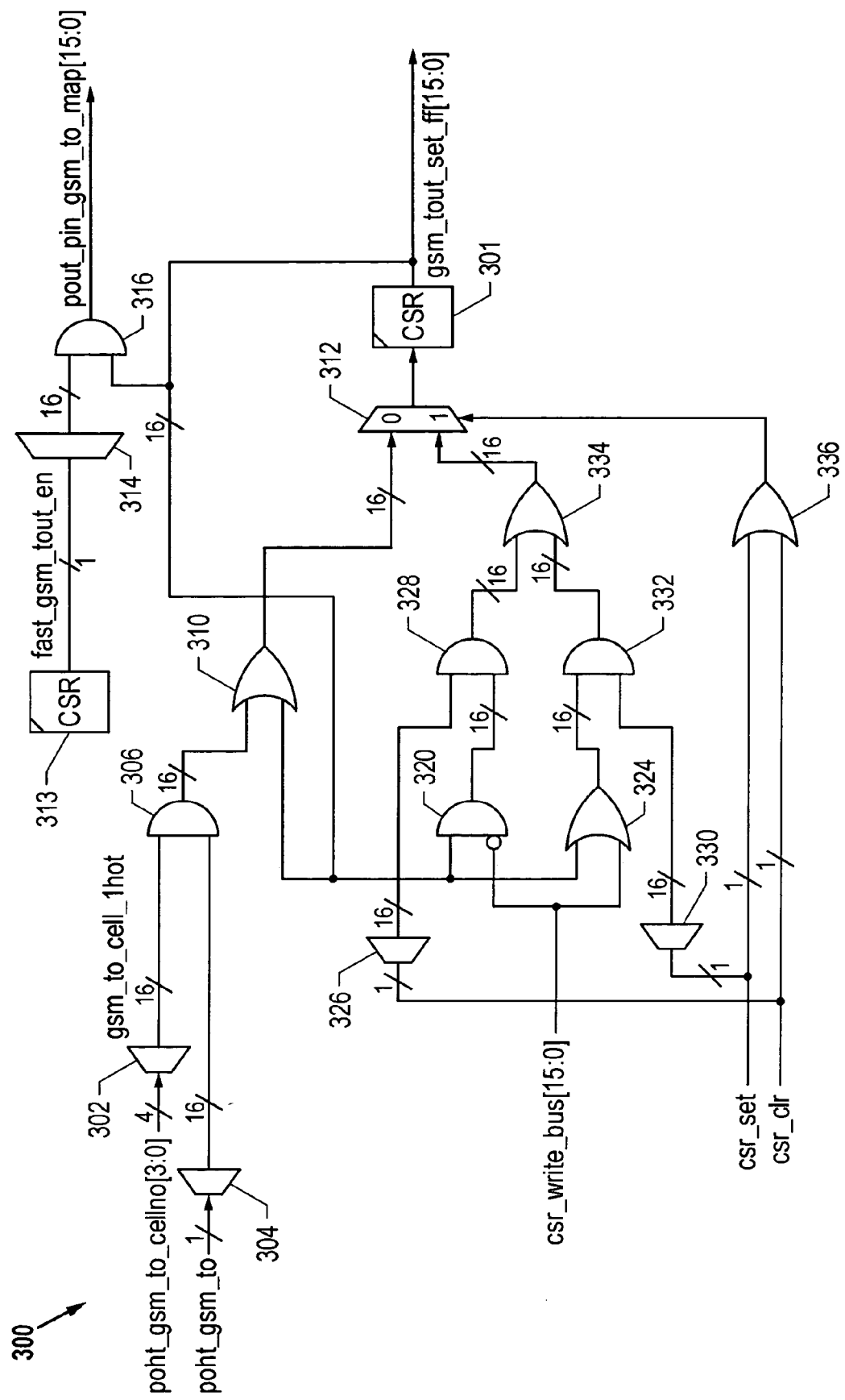
FIG. 3 is a schematic block diagram of a processor out control status register ("POCSR") logic block of the cache controller of FIG. 2.

FIG. 3 is a schematic block diagram of a circuit 300 within the POCSR block 208 for setting the appropriate bit(s) in the timeout map 214, which is implemented as a CSR 301. The inputs to the circuit 300 are the poht_gsm_to_cellno[3:0] signal and the poht_gsm_to signal. The cell number contained in the poht_gsm_to_cellno[3:0] signal is decoded at a decoder 302 to produce a gsm_to_cell_1hot signal. In the example set forth above, wherein the cell number is 5, the gsm_to_cell_1hot signal is [0000000000100000]. The poht_gsm_to signal, which is asserted only on GSM timeouts, is replicated 16 times by a replicator 304 and bitwise ANDed with the gsm_to_cell_1hot signal via an AND circuit 306.

The output of the AND circuit 306 is a one-hot signal indicating the cell in connection with which a GSM timeout has occurred, if any. This signal is bitwise ORed with the contents of the CSR 301, comprising a gsm_tout_set_ff[15:0] signal, via an OR circuit 310. The output of the OR circuit 310 is input to a first input of a MUX 312. The output of the MUX 312 is input to the CSR 301. The foregoing portion of the circuit 300 enables the setting of a bit in the timeout map 214 implemented via the CSR 301 corresponding to a crashed cell.

The pout_pin_gsm_to_map[15:0] signal is generated as follows. A one-bit fast timeout enable signal fast_gsm_tout_en stored in a CSR 313 is replicated by a replicator 314 and bitwise ANDed with the contents of the CSR 301 (gsm_tout_set_ff[15:0]) using an AND circuit 316. The output of the AND circuit 316 is then provided as the pout_pin_gsm_to_map[15:0] signal.

Additionally, a csr_write_bus[15:0] signal comprises 16 bits to be written to the CSR 301. When a csr_set signal is asserted, a bit indicated by the csr_write_bus[15:0] is set in the CSR 301. In contrast, when a csr_clr signal is asserted, a bit indicated by the csr_write_bus[15:0] is cleared in the CSR 301. This is accomplished by CSR set/clear logic. In particular, the gsm_tout_set_ff[15:0] signal is bitwise ANDed with the inverse of the csr_write_bus[15:0] signal via an AND circuit 320. Similarly, the gsm_tout_set_ff[15:0] signal is bitwise ORed with the csr_write_bus[15:0] signal via an OR circuit 324. The csr_clr signal is replicated using a replicator 326 and the replicated csr_clr signal is bitwise ANDed with the output of the AND circuit 320 via an AND circuit 328. Similarly, the csr_set signal is replicated using a replicator 330. The replicated csr_set signal is bitwise ANDed with the output of the OR circuit 324 via an AND circuit 332. The outputs of the AND circuit 328 and the AND circuit 332 are bitwise ORed using via an OR circuit 334. The output of the OR circuit 334 is input to a second input of the MUX 312. The csr_set signal and the csr_clr signal are ORed via an OR gate 336 to create an enable signal to the MUX 312. Accordingly, when either the csr_set signal or the csr_clr signal is asserted, the bit identified by the contents of csr_write_bus[15:0] will be set or cleared, depending on which signal is asserted. Otherwise, the contents of the CSR 301 will be updated as indicated by the poht_gsm_to_cellno[3:0] signal.

Figure 4:
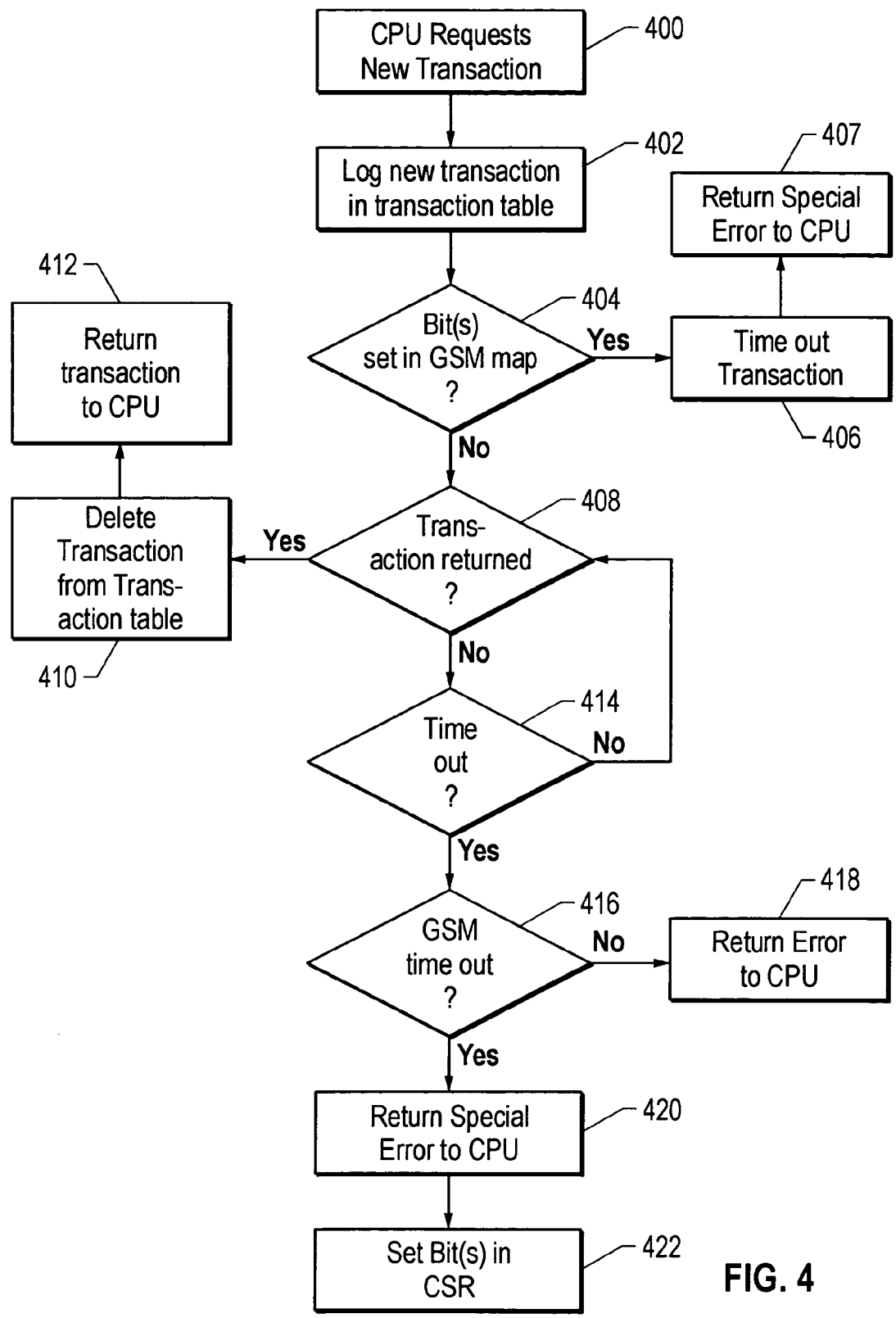
FIG. 4 is a flowchart of the operation of one embodiment of the cache controller of FIG. 2.

FIG. 4 is a flowchart of the operation of an embodiment for accelerating GSM timeouts. In block 400, a CPU requests a new transaction. In block 402, the new transaction is logged in the transaction table 210. In block 404, a determination is made whether a cell identity marker (e.g., one or more bits) corresponding to the cell to which the transaction was issued is set in the timeout map 214. If so, execution proceeds to block 406 in which the transaction is timed out in the transaction table and then to block 407 in which a special error is returned to the CPU that requested the transaction. In one embodiment, the special error is operable to indicate that the transaction be aborted. The embodiment then awaits another CPU new transaction request.

If in block 404 it is determined that the identity marker corresponding to the target cell is not set, execution proceeds to block 408, in which a determination is made whether the transaction has been returned. If in block 408 it is determined that the transaction has been returned, execution proceeds to block 410, in which the transaction is deleted from the transaction table, and then to block 412, in which the transaction is returned to the CPU that requested the transaction. The embodiment then awaits another CPU new transaction request.

If in block 408 it is determined that the transaction has not been returned, execution proceeds to block 414, in which a determination is made whether then transaction has timed out. If not, execution returns to block 408; otherwise, execution proceeds to block 416. In block 416, a determination is made whether the timeout is a GSM timeout. If not, in block 418, a timeout error is returned to the CPU and the embodiment awaits another CPU new transaction request. If in block 416 it is determined that the timeout is a GSM timeout (i.e., the cell to which the transaction is issued is outside the cell initiating the transaction), execution proceeds to block 420, a special error is returned to the CPU that requested the transaction and then to block 422, in which the bit(s) corresponding to the cell number is set in the timeout map 214. As before, the special error is operable to indicate that the transaction be aborted. The embodiment then awaits another new CPU transaction request.

An implementation of the invention described herein thus provides a timeout acceleration scheme for GSM-based multiprocessing computing systems. The embodiments shown and described have been characterized as being illustrative only; it should therefore be readily understood that various changes and modifications could be made therein without departing from the scope of the present invention as set forth in the following claims.

What is claimed is:

1. A method of operating a central cache controller ("CCC") in a first cell of a multiprocessor system comprising multiple cells each including globally shared memory ("GSM"), wherein the first cell is disposed in a first partition and the CCC is connected to a plurality of CPUs of the first cell, the method comprising:
   responsive to a new transaction request for a particular transaction from one of the CPUs, logging the particular transaction in a transaction table;
   determining whether an identity marker in a timeout map corresponding to a second cell to which the particular transaction was issued is set to a value indicating that a prior transaction issued to the second cell has timed out; and
   responsive to the corresponding identify marker in the timeout map being set to the value, returning an error to the one of the CPUs that requested the particular transaction.

2. The method of claim 1 further comprising:
   responsive to a determination that the corresponding identity marker is not set to the value, determining whether the particular transaction has been returned; and
   responsive to a determination that the particular transaction has been returned, deleting the particular transaction from the transaction table and returning the particular transaction to the one of the CPUs that requested the particular transaction.

3. The method of claim 1 wherein the new transaction request comprises a memory read.

4. A method of operating a central cache controller ("CCC") in a first cell of a multiprocessor system comprising multiple cells each including globally shared memory ("GSM"), wherein the first cell is disposed in a first partition and the CCC is connected to a plurality of CPUs of the first cell, the method comprising:
   responsive to a new transaction request from one of the CPUs, logging the transaction in a transaction table;
   determining whether an identity marker in a timeout map corresponding to a cell to which the transaction was issued is set;
   responsive to the corresponding identify marker in the timeout map being set, returning a special error to the one of the CPUs that requested the transaction;
   responsive to a determination that the corresponding identity marker is not set, determining whether the transaction has been returned;
   responsive to a determination that the transaction has been returned, deleting the transaction from the transaction table and returning the transaction to the one of the CPUs that requested the transaction;
   responsive to a determination that the transaction has not been returned, determining whether the transaction has timed out;
   responsive to a determination that the transaction has timed out, determining whether the timeout is a GSM timeout; and
   responsive to a determination that the timeout is not a GSM timeout, returning a timeout error to the CPU.

5. The method of claim 4 further comprising:
   responsive to a determination that the timeout is a GSM timeout, returning the special error to the CPU that requested the transaction.

6. The method of claim 5 further comprising, responsive to a determination that the timeout is a GSM timeout, setting in the timeout map an identity marker corresponding to the cell to which the transaction was issued.

7. The method of claim 4 wherein the determining whether the timeout is a GSM timeout comprises determining whether the cell to which the transaction was issued is in the same partition as the first cell that issued the transaction.

8. A central cache controller ("CCC") in a first cell of a multiprocessor system comprising multiple cells each including globally shared memory ("GSM"), wherein the first cell is disposed in a first partition and the CCC is connected to a plurality of CPUs of the first cell, the CCC comprising:
   means responsive to a new transaction request for a particular transaction from one of the CPUs for logging the particular transaction in a transaction table;
   means for determining whether an identity marker in a timeout map corresponding to a second cell to which the particular transaction was issued is set to a value indicating that a prior transaction issued to the second cell has timed out; and
   means responsive to the corresponding identity marker in the timeout map being set to the value for returning an error to the one of the CPUs that requested the particular transaction.

9. The CCC of claim 8 further comprising:
   means responsive to a determination that the corresponding identity marker in the timeout map is not set to the value for determining whether the particular transaction has been returned; and
   means responsive to a determination that the particular transaction has been returned for deleting the particular transaction from the transaction table and returning the particular transaction to the one of the CPUs that requested the particular transaction.

10. The CCC of claim 8 wherein the new transaction request comprises a memory read.

11. A central cache controller ("CCC") in a first cell of a multiprocessor system comprising multiple cells each including globally shared memory ("GSM"), wherein the first cell is disposed in a first partition and the CCC is connected to a plurality of CPUs of the first cell, the CCC comprising:
- means responsive to a new transaction request from one of the CPUs for logging the transaction in a transaction table;
- means for determining whether an identity marker in a timeout map corresponding to a cell to which the transaction was issued is set;
- means responsive to the corresponding identity marker in the timeout map being set for returning a special error to the one of the CPUs that requested the transaction;
- means responsive to a determination that the corresponding identity marker in the timeout map is not set for determining whether the transaction has been returned;
- means responsive to a determination that the transaction has been returned for deleting the transaction from the transaction table and returning the transaction to the one of the CPUs that requested the transaction;
- means responsive to a determination that the transaction has not been returned for determining whether the transaction has timed out;
- means responsive to a determination that the transaction has timed out for determining whether the timeout is a GSM timeout; and
- means responsive to a determination that the timeout is not a GSM timeout for returning a timeout error to the CPU.

12. The CCC of claim 11 further comprising means responsive to a determination that the timeout is a GSM timeout for returning the special error to the CPU that requested the transaction, the special error being operable to indicate that the transaction be aborted.

13. The CCC of claim 12 further comprising means responsive to a determination that the timeout is a GSM timeout for setting in the timeout map an identity marker corresponding to the cell to which the transaction was issued.

14. The CCC of claim 11 wherein the means for determining whether the timeout is a GSM timeout comprises means for determining whether the cell to which the transaction was issued is in the same partition as the first cell that issued the transaction.

15. A central cache controller ("CCC") in a first cell of a multiprocessor system comprising multiple cells each including globally shared memory ("GSM"), wherein the first cell is disposed in a first partition and the CCC is connected to a plurality of CPUs of the first cell, the CCC comprising:
- processor in ("PIN") logic for receiving transactions initiated by the CPUs;
- processor out return ("POUT Return") logic for returning to the CPUs results of transactions initiated thereby;
- processor out transaction control ("POTC") logic for tracking transactions initiated by the CPUs;
- processor out header translate ("POHT") logic for handling timeout of transactions initiated by the CPUs; and
- processor out control status register ("POCSR") logic for maintaining a timeout map for identifying cells, wherein responsive to receipt of a particular transaction directed to a cell identified in the timeout map as causing timeout of a prior transaction, the particular transaction is timed out in an accelerated manner.

16. The CCC of claim 15 wherein the POTC logic comprises a transaction table for entering the transactions initiated by a CPU.

17. The CCC of claim 16 wherein, if a transaction times out before it is returned, the POTC logic informs the POHT logic and the POHT logic returns an error via the POUT Return block and clears an entry corresponding to the transaction in the transaction table.

18. A central cache controller ("CCC") in a first cell of a multiprocessor system comprising multiple cells each including globally shared memory ("GSM"), wherein the first cell is disposed in a first partition and the CCC is connected to a plurality of CPUs of the first cell, the CCC comprising:
- processor in ("PIN") logic for receiving transactions initiated by the CPUs;
- processor out return ("POUT Return") logic for returning to the CPUs results of transactions initiated thereby;
- processor out transaction control ("POTC") logic for tracking transactions initiated by the CPUs:
- processor out header translate ("POHT") logic for handling timeout of transactions initiated by the CPUs; and
- processor out control status register ("POCSR") logic for maintaining a timeout map for identifying cells, wherein responsive to receipt of a particular transaction directed to a cell identified in the timeout map as causing timeout of a prior transaction, the particular transaction is timed out in an accelerated manner,
- wherein the POTC logic comprises a transaction table for entering the transactions initiated by a CPU,
- wherein, if a transaction times out before it is returned, the POTC logic informs the POHT logic and the POHT logic returns an error via the POUT Return logic and clears an entry corresponding to the transaction in the transaction table, and wherein, if a GSM transaction times out before it is returned, the POHT logic asserts a GSM timeout error to the POCSR logic.

19. The CCC of claim 18 wherein the GSM timeout error identifies a cell from which the CPU was attempting a read.

20. The CCC of claim 19 wherein responsive to receipt of the GSM timeout error from the POHT logic, the POCSR logic sets an identity marker in the timeout map corresponding to the identified cell from which the CPU was attempting a read.

21. The CCC of claim 20 wherein the POCSR logic is operable to transmit the contents of the timeout map to the PIN logic.

22. A multiprocessing computer system, comprising:
- a plurality of cells each including a globally shared memory ("GSM") block;
- a central cache controller ("CCC") associated with a first cell of the multiprocessing computer system; and
- a logic structure associated with the CCC of the first cell for accelerating timeout of a transaction issued by a processor of the first cell to access a GSM block of a second cell,
- wherein the logic structure of the first cell includes a timeout map identifying target cells based on whether most recent GSM access transactions to the target cells have been timed out.

23. The multiprocessing computer system of claim 22, wherein the plurality of cells are arranged in a symmetric multiprocessor architecture.

24. The multiprocessing computer system of claim 22, wherein the plurality of cells are arranged in a cache-coherent nonuniform memory access (ccNUMA) architecture.

25. The multiprocessing computer system of claim 22, wherein the plurality of cells are arranged in multiple hardware partitions.

* * * * *

UNITED STATES PATENT AND TRADEMARK OFFICE
CERTIFICATE OF CORRECTION

PATENT NO.        : 7,774,562 B2                           Page 1 of 1
APPLICATION NO.   : 10/944524
DATED             : August 10, 2010
INVENTOR(S)       : Richard W. Adkisson et al.

It is certified that error appears in the above-identified patent and that said Letters Patent is hereby corrected as shown below:

In column 5, line 50, in Claim 1, delete "identify" and insert -- identity --, therefor.

In column 6, line 9, in Claim 4, delete "identify" and insert -- identity --, therefor.

In column 8, line 15, in Claim 18, delete "CPUs:" and insert -- CPUs; --, therefor.

Signed and Sealed this
First Day of March, 2011

David J. Kappos
*Director of the United States Patent and Trademark Office*